July 15, 1952     O. C. BREWSTER     2,603,539
HIGH-SPEED ROTOR
Filed May 11, 1948
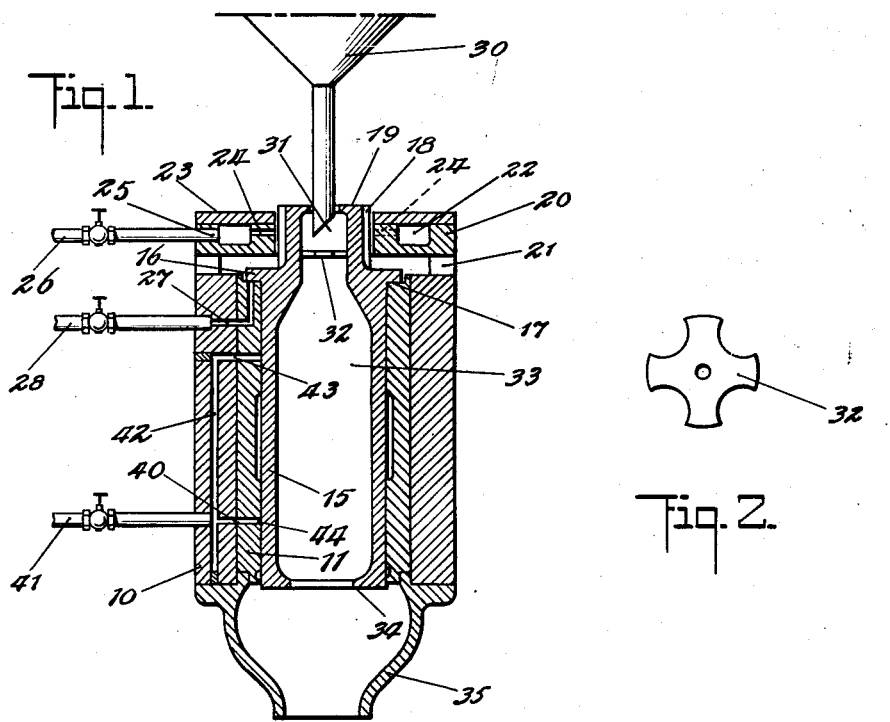
Fig. 1.
Fig. 2.
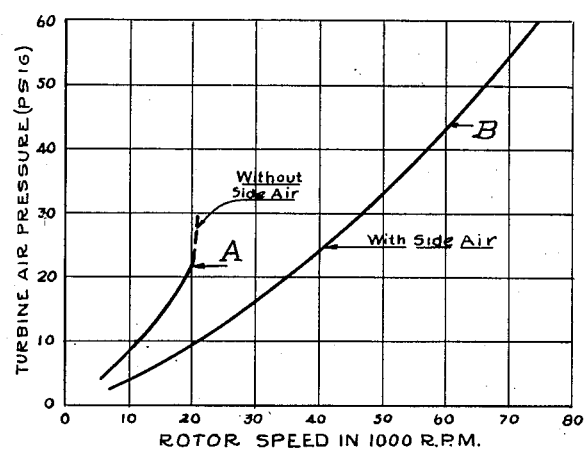
Fig. 3.
INVENTOR.
OSWALD C. BREWSTER
BY
Davis Hoxie & Faithfull
ATTORNEYS Patented July 15, 1952

2,603,539

UNITED STATES PATENT OFFICE 2,603,539

HIGH-SPEED ROTOR

Oswald C. Brewster, Litchfield, Conn.

Application May 11, 1948, Serial No. 26,349

2 Claims. (Cl. 308—9)

This invention is a method for suppressing bearing whip in high speed rotors where the bearing is lubricated by a film of air or other gas.

High speed rotation requires the avoidance or elimination of two conditions, frictional resistance and whip.

Friction depends on the type of lubricant, the character of the bearing surfaces, and the clearance between them, and is not directly dealt with by this invention.

Whip is a lateral motion, oscillatory or vibratory in character, of the rotor in relation to the fixed part of the bearing or journal. It may occur in any journal bearing in which there is clearance between the fixed and rotating parts, a condition which exists almost universally; and as a rule it is more pronounced and more likely to occur as that clearance is increased, as well as with increase of speed. At some speed, this vagrant motion becomes so rapid and takes on such force that the lubricant film is broken and the rotor comes into direct rubbing contact with the bearing surface, causing excessive friction and often destructive wear or seizure. This condition of extreme whip is made entirely evident by the noise generated, but well short of it there is whip which increases the resistance to rotation.

It is possible with ball or roller bearings to minimize the clearance to such an extent that there is little tendency to whip, while friction also is minimized; but even that expedient does not permit indefinite increase of speed; and its use requires more complex and costly bearing structures as the speed to be attained is higher.

With journal bearings, which are desirable because of their simplicity and low cost, the avoidance of both friction and whip is made difficult by the fact that the increase of clearance which minimizes friction is the very condition that increases the tendency to whip. This puts a limit on the possible speed of rotation. The problem is especially acute when air or other gas is used for the lubricant film, since such a film is more easily broken and destructive whip occurs at a lower speed than with a liquid lubricant. Moreover, a gas lubricant is compressible and admits of sudden changes of volume, whereas a liquid or other incompressible fluid lubricant exerts a damping action. Thus the use of a gas lubricant is conducive to whip. Yet for many situations it is highly desirable to use a gas film lubricant.

The aim of this invention is to permit the use of higher speeds of rotation with journal bearings lubricated by a film of air or other gas.

The basic idea is to impose a lateral gas pressure on the rotor at one side of its axis, thereby to suppress or overcome the tendency to whip. I refer to this as "side air" or "side air pressure." This requires no change in the bearing itself, but only a passage through the fixed member, either journal or bearing, opening to the space in which the rotor turns, together with a connection to a supply of gas under moderate pressure.

The effect of this is striking. With a solid steel shaft one-half inch in diameter turning in a babbitted bearing and having a clearance of about 0.001 inch in diameter, with air film lubrication, I found that I could not obtain a speed higher than about 55,000 R. P. M. On increasing the power applied by the small air turbine running this rotor there was increased noise and serious laboring with violent changes in speed making stroboscopic speed determination impossible; but apparently around 55,000 R. P. M. was the maximum speed obtained. At lower speeds there was still noticeable whip but its effect was less serious. In contrast when side air pressure was applied at 12 p. s. i. g., a rotor speed of 55,000 R. P. M. was obtained without whip; at 23 p. s. i. g., a speed of 100,000 R. P. M. was obtained; and at about 50 p. s. i. g., the speed reached 187,000 R. P. M. without production of whip. Limitation to that speed was imposed by the driving means, an extremely simple air turbine, rather than by any condition at the bearing. A more carefully balanced shaft could attain an even higher speed, given a suitable prime mover.

With the journal bearing just described, operated at speeds below that at which limiting whip occurs, there is present the well known wedge action in the film of gas lubricant. This action is due to the frictional drag of the rotor on the gas. It is the characteristic of this action that any eccentricity of the rotor, caused by its own weight or by its external mechanical load, causes the fluid to build up a pressure in the gas film in a zone just behind the point of minimum clearance between rotor and stator. This pressure, which has an upward gradient toward the point of minimum clearance, creates the wedge action and tends to move the rotor toward a concentric relation to the stator, which is the ideal relation from the standpoint of lubrication; and as is well understood this action plays a vital role in maintaining the lubricant film. The phenomenon of whip which limits the attainable speed involves forces which that wedge action can not control and there is an eventual break-down of the gas film when such limiting whip occurs.

When "side air" is applied in accordance with this invention, as described above, it will be found that the rotor is held in an eccentric relation to the stator by the radial force exerted by the gas introduced under pressure into the bearing zone at one side. A wedge action is of course developed by this eccentricity and acts in opposition to the "side air" pressure. Since the wedge action is greater as higher speeds are attained, increased "side air" pressure is required as in the examples cited above to permit a further increase in speed without whip. The "side air" pressure, as is evident, must not be so great as to overcome the opposing wedge action and break the gas film.

The precise nature of the whole system of forces set up is not fully understood, and no theory is here advanced as to why limiting whip is suppressed by the application of "side air" as here described; but it is inherent in the action, as illustrated by the example given above, that the rotor is caused to run in an eccentric relation to the stator with a resulting wedge action opposing the radial force of the applied "side air." While this is counter to what is ideal from the standpoint of lubrication alone, the benefit obtained in the way of increased speed more than compensates, and there is still sufficient lubrication as evidenced by the fact that the bearing operates without overheating and without any frictional interference with the attainment of speeds exceeding that to which the bearing would otherwise be limited by whip.

Generally, the effect of imposing a lateral gas pressure on such a rotor is, first, to permit use of a clearance which gives minimum friction, and second, despite the relatively great clearance, to overcome the tendency of the rotor to whip even at speeds which heretofore have been considered little short of phenomenal. At any given clearance, even a relatively small one, and without this invention, there is a limiting speed at which whip will occur, unless the clearance is so small that friction limits the speed before the speed of objectionable whip is reached. In any case where whip creates the limiting condition, application to such a rotor of lateral gas pressure raises the limit and permits rotation at a very much higher speed, often more than triple the former limiting speed. Where friction alone has created the limit on attainable speed, that limit likewise can be raised by increasing the clearance and by use of this invention to overcome the resulting greater tendency to whip. While in theory a bearing will operate as long as there is any clearance at all, as a practical matter an appreciable clearance must be provided since the perfection required of the bearing surfaces must be of a higher and higher order as the clearance is reduced. Furthermore, even with more nearly perfect surfaces, friction increases with decreased clearance and frictional heating of the bearing may become serious. Thus even though ample driving power is available the heating problem can become the limiting factor with small clearance and highly precise surfaces. The invention therefore resolves the difficulties which formerly have imposed a quite definite limit upon the speed of gas lubricated rotors in journal bearings.

In consequence of this invention, it is open to devise a number of simple ultra-high speed apparatuses, such as centrifuges, grinders, spray driers, drills, polishers, etc., without recourse to complex and costly bearing structures and with the many advantages that attend the use of a gas film lubricant. I describe in the following a novel centrifuge unit as an example of the invention in whip suppression and as an example of the simple character of apparatus which this invention makes possible (with or without further invention, as the case may be). The centrifuge illustrated is one adapted for work with a light load, as in laboratory separations, and is run at a speed of around 75,000 R. P. M.

In the accompanying drawings of this centrifuge,

Figure 1 is a vertical section.

Figure 2 is an enlarged plan view of a spider shown as part number 32 in Figure 1.

Figure 3 is a chart of rotor speed against power input in terms of the pressure of the air used to operate the driving turbine, the two curves showing the difference in operation of the centrifuge of Figure 1 with and without use of the invention in whip suppression.

The cylinder 10 is a single block having a central bore lined with babbitt metal 11 forming a bearing surface of about 1 inch inside diameter.

The hollow rotor 15 forms the bowl of the centrifuge, and the impeller of the gas turbine which drives it. The main part of the rotor, forming the journal turning in bearing 11, has an outward supporting flange 16 resting in a shallow annular recess 17 at the inner rim of the top of the cylinder; and above that it has a neck of reduced diameter which is longitudinally fluted on its outer surface to form a simple turbine impeller 18. The top rim 19 is left exposed to permit stroboscopic observation. This turbine is of course quite inefficient, but for the work to which this centrifuge is adapted the simplicity of the impeller is a factor of greater moment than is its power requirement.

The nozzle ring 20 fitting closely around the impeller 18, and resting on a number of spacer blocks 21 on top of the cylinder, has an annular gas supply chamber or manifold 22 open at the top and covered by a ring disc 23 soldered thereto. A series of openings 24 leading from the chamber 22 to the inner wall of the nozzle ring form the turbine nozzles delivering gas under pressure at an angle against the flutings of the impeller 18. An inlet passage 25 serves to deliver gas to the chamber 22 from a valved supply line 26. This entire nozzle ring 20 is removable to give access to the centrifuge bowl for cleaning.

A passage 27 leads from a gas inlet, connecting with a valved supply line 28, to the shallow recess 17 in which the rotor flange rests. Gas under pressure fed through this passage resists end thrust and floats the rotor during operation.

The centrifuge bowl within the rotor is bottle shaped as shown. The mixture to be separated is fed in through line 30 extending into the neck 31, at the bottom of which is a spider 32 pressed into the neck (see Figure 2) which breaks the down flow of the incoming stream and causes the liquid mixture to come into contact with the inner wall of the bowl and to be brought up to the speed of the bowl. The liquid mixture travels down this inner wall into the enlarged part 33 of the bowl where it is subjected to the maximum centrifugal force. The heavier solids contained in the liquid collect on the wall while the liquid fraction flows down the wall and over the lip 34, and is thrown outward and downwardly against the inner wall of the collector and discharge spout 35 attached to the bottom of the cylinder 10.

At one side of the cylinder 10 there is a gas inlet 40 leading from a valved supply line 41 to a small longitudinal bore 42 within the cylinder. From this bore lead two vertically spaced lateral ducts 43, 44 which open to the rotor space at the surface of the journal bearing. Compressed air or other gas from line 41 is thereby delivered into the rotor space at one side and imposes a pressure on the rotor 15 which overcomes its tendency to whip.

It is possible to employ compressed air at a single pressure for two or all three of the purposes described, impeller drive, rotor lift and whip suppression, but I prefer to control each supply separately in order to hold the optimum pressure for each use.

The rotor illustrated had an outer diameter of 1 inch and a diametral clearance of about 0.0012 inch, which is relatively great and tends to a minimum frictional resistance and maximum whip. Figure 3 shows its operating characteristics in terms of rotational speed against pressure of the propulsion air supply at the turbine.

Curve A in Figure 3 shows operation with no "side air," meaning no supply of compressed air through line 41 and passages 42, 43 and 44 to the rotor space. Speed increased with increased pressure of the propulsion air until a speed of about 20,000 R. P. M. was reached. At that point violent whip was evidenced both by the noise and vibration of the unit and by the fact that further increase of air pressure at the turbine produced no increase in speed. The friction of the rotor in its multitude of direct contacts with the bearing surface put a limit on the speed and jamming was imminent. To avoid serious damage it was necessary to reduce the propulsion air pressure to lower the speed until the whip lessened to a tolerable amount that did not break the lubricating air film, as evidenced by smooth and quiet rotation.

Curve B shows operation with "side air" applied from line 41 at a pressure just sufficient to eliminate whip at each speed. The reduction in frictional resistance is apparent, even in the range of propulsion air pressure of Curve A, for at all pressures in that range a higher speed was attained except in the range of very low speed. The suppression of whip is evidenced by the continued increase in speed as the propulsion air pressure was increased to 60 p. s. i. g. which was the maximum available. At that propulsion pressure, the speed was 74,700 R. P. M. and there was no indication of incipient whip. This represents close to a four fold increase in attainable speed with the identical centrifuge.

With a smaller clearance, and no "side air," a like rotor can be made to run at speeds above 20,000 R. P. M., but the frictional resistance apart from whip is greater, and at any given power input the speed is lower than with a larger clearance when "side air" is applied.

Working with a variety of rotors, I find that application of the "side air" during operation results in an immediate and substantial increase of speed, propulsion air pressure being unchanged, both when the rotor is below the speed of dangerous whip and when it is at that otherwise limiting speed. It is evident therefore that at all substantial speeds whip is a deterring factor even when not so serious as to impose a ceiling on the attainable speed.

There is no evidence that the "side air" applied to suppress whip aids the existing air film lubrication; or that it has any effect in common with the forcibly fed lubricants sometimes used in bearings lubricated by oils or greases.

While the invention has been illustrated by a vertical axis unit it is useful also in units rotating on a horizontal or an inclined axis where the problem of bearing whip with gas film lubricated bearings is also present, although not to the same degree.

I claim:

1. The method of running a gas lubricated journal bearing at rotor speeds above that at which bearing whip otherwise is a limiting factor, which consists in applying to the rotor at one side only the radial force of a gas introduced under pressure into the bearing zone at said one side to hold the rotor in an eccentric relation to the stator against the opposing wedge action incident to that eccentric relation.

2. The method of running a gas lubricated journal bearing at rotor speeds above that at which bearing whip otherwise is a limiting factor, which consists in introducing a gas under pressure into the bearing zone at one side only of the rotor and thereby holding the rotor in an eccentric relation to the stator against the opposing wedge action incident to that eccentric relation.

OSWALD C. BREWSTER.

REFERENCES CITED

The following references are of record in the file of this patent:

UNITED STATES PATENTS

| Number | Name | Date |
|---|---|---|
| Re. 20,305 | Klahn | Mar. 23, 1937 |
| 808,092 | Ketcham | Dec. 26, 1905 |
| 1,510,657 | Coleman | Oct. 7, 1924 |
| 1,811,157 | Schwerdtfeger | June 23, 1931 |
| 2,213,107 | McBain | Aug. 27, 1940 |
| 2,375,269 | Yeomans | May 8, 1945 |

OTHER REFERENCES

Review of Scientific Instruments, vol. 9, pp. 413–416, December 1938.